W. C. ANDERSON.
ALIGNING CLIP FOR GASKETS AND THE LIKE.
APPLICATION FILED SEPT. 3, 1920.
1,435,887.                                    Patented Nov. 14, 1922.
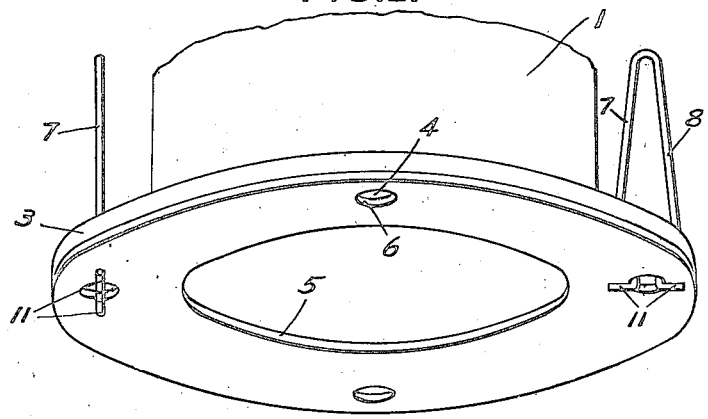
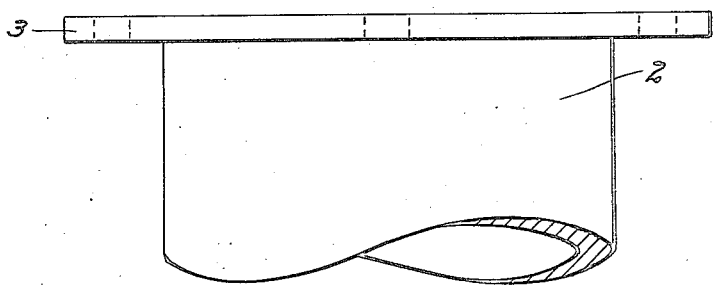
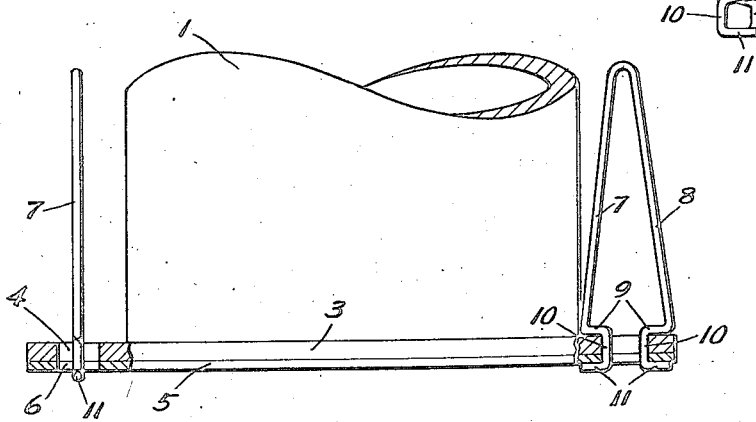
INVENTOR
WILL C. ANDERSON
Hazard & Miller
ATT'YS.

Patented Nov. 14, 1922.

1,435,887

UNITED STATES PATENT OFFICE.

WILL C. ANDERSON, OF CORONA, CALIFORNIA.

ALIGNING CLIP FOR GASKETS AND THE LIKE.

Application filed September 3, 1920. Serial No. 407,962.

*To all whom it may concern:*

Be it known that I, WILL C. ANDERSON, a citizen of the United States, residing at Corona, in the county of Riverside and State of California, have invented new and useful Improvements in Aligning Clips for Gaskets and the like, of which the following is a specification.

It is the object of this invention to provide means for positively aligning gaskets and the like with relation to one of two elements between which the gasket is to be positioned, the aligning means comprising clips engaging the gasket and extending through the openings provided in the element for the fastening means adapted to connect the elements. By this arrangement the gasket is correctly positioned with relation to one of the elements, and when the elements to be connected are brought together, the aligning clips may be removed one at a time in order to permit the positioning of the fastening bolts or the like.

The invention will be readily understood from the following description of the accompanying drawings in which—

Figure 1 is a perspective view of pipe sections adapted to be connected with a gasket interposed between the pipe sections, the gasket being shown held in position with relation to one of the pipe sections by the improved aligning means.

Figure 2 is a side elevation of a pipe section having the gasket positioned with relation to the same by means of the aligning clips, portions of the pipe section and gasket being in vertical section.

Figure 3 is a side elevation of one of the aligning clips showing the same in its compressed position.

I have illustrated the invention as applied to the positioning of a gasket between the meeting flanges of pipe sections. It will be understood, however, that the invention is applicable to the positioning of either gaskets or any other structure adapted to be positioned between two elements to be connected. It will also be understood that the elements to be connected may include various constructions such, for example, as cylinder blocks for internal combustion engines and the cylinder heads.

In the drawings pipe sections are shown at 1 and 2 having the end flanges 3 adapted to be brought together and connected by suitable bolts extending through bolt holes 4 in the flanges. A gasket to be positioned between the meeting surfaces of flanges 3 is shown at 5. It will be understood that this gasket is provided with bolt holes 6 arranged to aline with bolt holes 4, in order that the retaining bolts may be received through both the gasket and the pipe flanges.

The present invention provides means for positioning the gasket with relation to one of the flanges, in order that the pipe section having said flange may be placed upon the other pipe section and thereby properly position the gasket between the same. The gasket is positioned with relation to the pipe flange by means of spring clips one of which is adapted to be received through each of the alined bolt holes of the pipe flange and gasket. These spring clips may be formed of a piece of wire reversely bent to form arms 7 and 8. These arms at their free ends are provided with inwardly bent portions 9, at the ends of which angularly bent portions 10 are provided. The portions 10 of the spring arms terminate in outwardly bent ends 11. In using a clip the arms 7 and 8 are moved toward one another so that the portions 9 and 11 of the arms overlap and the clip is substantially the same width throughout its length. This position of the clip will be readily understood by reference to Figure 3. The clip is then inserted through a bolt hole of the pipe flange and through a bolt hole of the gasket for aligning the gasket with relation to the pipe flange. The portions 9 and 11 of the clip are so spaced apart that the portions 9 will rest against the outer surface of flange 3 when the portions 11 rest against the outer surface of the gasket held against the pipe flange. With the parts in this position the spring clip is released and the tension of the same will cause the arms 7 and 8 to spring apart until the portions 10 of the arms rest against opposite sides of bolt holes 4 and 6. The portions 9 and 11 of the spring arms will then rest against the outer surfaces of the pipe flange and the gasket respectively, as clearly shown in Figure 2, in order to hold the gasket in position with relation to the pipe flange. It will be understood that clips are inserted through as many of the alined bolt holes 4 and 6 as is necessary to properly position the gasket with relation to the pipe section. The two pipe sections are then brought together and the fastening bolts are positioned in the alined bolt holes, the aligning clips being removed one at a time, in order to permit of the positioning of the bolts.

Various changes may be made in the construction as thus described without departing from the spirit of the invention.

What is claimed is:

1. The combination with elements and a packing received between the same with alined openings extending through said elements and packing, of clips received through the openings of one of said elements and the packing for aligning said packing when assembling the parts.

2. The combination with elements and a packing received between the same with alined openings extending through said elements and packing, of clips received through the openings of one of said elements and the packing for aligning said packing when assembling the parts, said clips comprising spring members adapted to detachably hold said packing to said element.

3. A device for positioning two assembled pieces having registering holes, said device consisting of a pair of resilient arms each having at its free end a shallow U-shaped element opening outwardly, the connecting part of the U-shaped element being substantially straight and parallel to its respective arm and adapted to spring out against the sides of the said holes when inserted therein.

In testimony whereof I have signed my name to this specification.

WILL C. ANDERSON.